US008739385B2

(12) United States Patent
Verardo et al.

(10) Patent No.: US 8,739,385 B2
(45) Date of Patent: Jun. 3, 2014

(54) ASSEMBLY OF A PART THAT HAS NO PLASTIC DOMAIN

(75) Inventors: Marco Verardo, Les Bois (CH); Pierre Cusin, Villars-Burquin (CH); Arthur Queval, Lutry (CH)

(73) Assignee: Nivarox-FAR S.A., Le Locle (CH)

( * ) Notice: Subject to any disclaimer, the term of this patent is extended or adjusted under 35 U.S.C. 154(b) by 265 days.

(21) Appl. No.: 13/331,671

(22) Filed: Dec. 20, 2011

(65) Prior Publication Data

US 2012/0159766 A1 Jun. 28, 2012

(30) Foreign Application Priority Data

Dec. 22, 2010 (EP) ..................................... 10196580

(51) Int. Cl.
*B21D 39/00* (2006.01)
*B23P 11/00* (2006.01)

(52) U.S. Cl.
USPC .......................... 29/522.1; 29/520; 29/896.31

(58) Field of Classification Search
CPC ......... B21D 39/00; B23P 11/00; B23P 11/02; B23P 19/10
USPC ........ 29/450, 451, 453, 505, 522.1, 520, 525, 29/896.31
See application file for complete search history.

(56) References Cited

U.S. PATENT DOCUMENTS

| | | | | |
|---|---|---|---|---|
| 7,979,967 | B2 * | 7/2011 | Schmidt | 29/11 |
| 2005/0235476 | A1 * | 10/2005 | Spence et al. | 29/446 |
| 2010/0054089 | A1 | 3/2010 | Maier et al. | |
| 2010/0093197 | A1 * | 4/2010 | Sander | 439/82 |
| 2011/0271487 | A1 * | 11/2011 | Schmidt | 16/380 |
| 2012/0090933 | A1 * | 4/2012 | Conus et al. | 188/371 |
| 2012/0159767 | A1 * | 6/2012 | Verardo et al. | 29/520 |
| 2013/0011186 | A1 * | 1/2013 | Kawame et al. | 403/280 |
| 2013/0286795 | A1 * | 10/2013 | Conus et al. | 368/127 |
| 2013/0309446 | A1 * | 11/2013 | Conus et al. | 428/135 |

FOREIGN PATENT DOCUMENTS

| | | | |
|---|---|---|---|
| CH | 699 680 | A2 | 4/2010 |
| CH | 700 260 | A2 | 7/2010 |
| EP | 1 850 193 | A1 | 10/2007 |
| EP | 2 075 652 | A1 | 7/2009 |
| FR | 1 427 115 | | 2/1966 |
| WO | WO 2008/135817 | A2 | 11/2008 |

OTHER PUBLICATIONS

U.S. Appl. No. 13/331,694, filed Dec. 20, 2011, Verardo, et al.
European Search Report issued Jun. 30, 2011, in European Patent Application No. 10196580.4, filed Dec. 22, 2010 (with English Translation).

* cited by examiner

*Primary Examiner* — Alexander P Taousakis
(74) *Attorney, Agent, or Firm* — Oblon, Spivak, McClelland, Maier & Neustadt, L.L.P.

(57) ABSTRACT

A method of assembling a member made of a first material in a part made of a second material having no plastic domain, including forming the part with an aperture; inserting an intermediate part, which is made of a third material and includes a hole into the aperture without any stress; introducing the member into the hole without any stress; elastically and plastically deforming the intermediate part by moving two tools towards each other axially, respectively on the top and bottom parts of the intermediate part, so as to exert a radial stress against the member and against the wall of the part surrounding the aperture by causing the elastic deformation of the part, in order to secure the assembly in a manner that is not destructive for the part. The member can be a time piece.

17 Claims, 4 Drawing Sheets

ASSEMBLY OF A PART THAT HAS NO PLASTIC DOMAIN

This application claims priority from European Patent Application No. 10196580.4 filed Dec. 22, 2010, the entire disclosure of which is incorporated herein by reference.

FIELD OF THE INVENTION

The invention relates to the assembly of a part, made of a material having no plastic domain, to a member comprising a different type of material.

BACKGROUND OF THE INVENTION

Current assemblies including a silicon-based part are generally secured by bonding. This type of operation requires extremely delicate application which makes it expensive.

EP Patent No. 2 107 433 discloses a first, silicon-based part which is assembled on an intermediate metallic part and the whole assembly is then mounted on a metal arbour. However, the embodiments proposed in this document are unsatisfactory and either cause the silicon-based part to break during assembly, or do not bind the parts sufficiently well to each other.

Indeed, in this document, one end of the intermediate part is folded over the silicon part generating purely axial stresses, which results in the breakage of the silicon part. Further, the document proposes the use of faceting which leads to a non-uniform distribution of stress on the silicon and also causes the silicon part to break.

SUMMARY OF THE INVENTION

It is an object of the present invention to overcome all or part of the aforecited drawbacks by providing an adhesive-free assembly which can secure a part made of a material with no plastic domain to a member comprising a ductile material, such as, for example, a metal or metal alloy.

Thus, the invention relates to a method of assembling a member made of a first material in a part made of a second material having no plastic domain. The method includes the following steps:

a) forming the part with an aperture;
b) inserting an intermediate part, which is made of a third material and includes a hole, into the aperture without any stress;
c) Introducing said member into the hole;
d) elastically and plastically deforming the intermediate part by moving two tools towards each other axially, respectively on the top and bottom parts of said intermediate part, so as to exert a radial stress against the member and against the wall of the part surrounding the aperture, causing the elastic deformation of the part, in order to secure the assembly in a manner that is not destructive for said part.

This method advantageously allows the member to be radially secured without any axial stress being applied to the part. Indeed, advantageously according to the invention, only radial, elastic deformation is applied to the part.

Further, this configuration advantageously enables the assembly comprising the part—intermediate part—member to be secured without bonding to an ordinary, precision controlled member, while ensuring that the part is not subject to destructive stresses, even if is formed, for example, from single crystal silicon.

Finally, this method unites the assembly comprising the part—intermediate part—member by adapting to the dispersions in manufacture of the various components.

In accordance with other advantageous features of the invention:

The shape of the external wall of the intermediate part substantially matches the aperture in the part so as to exert a substantially radial stress on the wall of the part surrounding the aperture;

The aperture in the part is circular;

The wall of the part surrounding the aperture includes flutes, which, during step d), will form micro-grooves on the external surface of the intermediate part to prevent any relative movements between the elements of said assembly;

The external surface of the member includes flutes, which, during step d) will form micro-grooves on the internal surface of the intermediate part to prevent any relative movements between the elements of said assembly;

The aperture in the part is asymmetrical to prevent any relative movements between the elements of said assembly;

In step b), the difference between the section of the aperture and the external section of the intermediate part is around 10 μm;

In step c), the difference between the section of the member and the internal section of the intermediate part is around 10 μm;

In step d), the deformation exerts a clamping force generating a displacement of between 16 and 40 μm;

In step b), the intermediate part includes a conical recess coaxial to the hole, in order, in step d) to facilitate orientation of the stress caused by the deformation of the intermediate part;

The second material is formed from a base of single crystal silicon;

The third material is formed from a metal or metal alloy base;

The part may be, for example, a timepiece wheel set, timepiece pallets, a timepiece balance spring, a resonator or even a MEMS.

BRIEF DESCRIPTION OF THE DRAWINGS

Other features and advantages will appear clearly from the following description, given by way of non-limiting indication, with reference to the annexed drawings, in which.

DETAILED DESCRIPTION OF PREFERRED EMBODIMENTS

Figure 1:
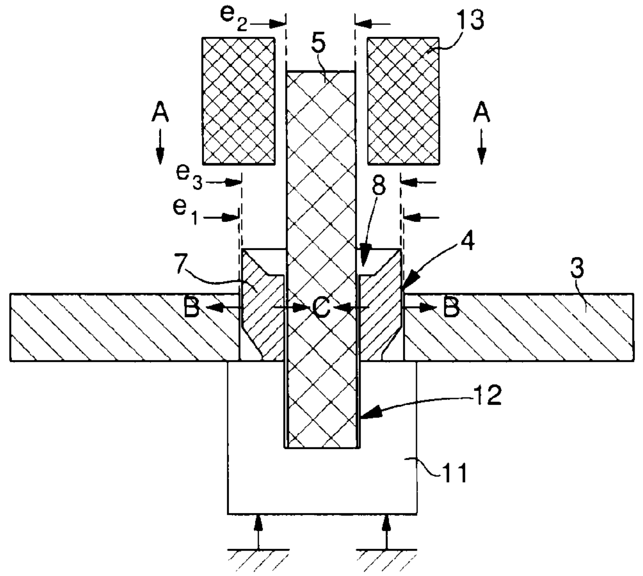
FIGS. 1 and 2 are schematic diagrams of successive steps of the assembly method according to the invention.

As explained above, the invention relates to an assembly and the method of assembling the same, for uniting a fragile material, i.e. which has no plastic domain, such as a single crystal silicon-based material, with a ductile material such as a metal or metal alloy.

This assembly was devised for applications within the field of horology. However, other domains may very well be envisaged, such as, notably aeronautics, jewellery, the automobile industry or tableware.

In the field of horology, this assembly is required due to the increasing importance of fragile materials, such as those based on silicon, quartz, corundum or more generally ceramics. By way of example, it is possible to envisage forming the balance spring, balance, pallets, bridges or even the wheel sets, such as the escape wheels, completely or partially from a base of fragile materials.

However, always being able to use ordinary steel arbours, the fabrication of which has been mastered, is a constraint which is difficult to reconcile with the use of parts having no plastic domain. Indeed, when tests were carried out, it was impossible to drive in a steel arbour and this systematically broke fragile parts, i.e. those with no plastic domain. For example, it became clear that the shearing generated by the entry of the metallic arbour into the aperture in a silicon part systematically breaks the part.

Within the field of horology, there is a technical prejudice that tends therefore to consider that a silicon part cannot withstand stress of more than between 300 and 450 MPa without breaking. This scale of value is estimated theoretically from the Young's modulus which characterizes the elastic domain of silicon.

Consequently, for cases where the estimated stresses exceed this range of between 300 and 450 MPa, elastic deformation means formed by pierced through holes in the silicon were thus developed, such as those disclosed in EP Patent No 1 445 670, and WO Patent Nos. 2006/122873 and 2007/099068.

When additional tests were carried out, by deforming an intermediate part and gradually increasing the stress applied to the silicon part, it became clear, surprisingly, that the silicon part could actually withstand a much higher stress before any incipient cracks were detected. Thus, unexpectedly, the tests were extended to a range of stress of between 1.5 and 2 GPa without breakage, i.e. well beyond the technical prejudice ranging between 300 and 450 MPa. Consequently, broadly speaking, fragile materials such as silicon, quartz, corundum or more generally ceramics, do not necessarily follow the statistical models usually used for fragile parts.

This is why the invention relates to an assembly between a member made of a first material, for example a ductile material such as steel, in the aperture in a part made of a second material having no plastic domain, such as a silicon-based material, by the deformation of an intermediate part, made of a third material, which is mounted between said member and said part.

According to the invention, the intermediate part includes a hole for receiving said member. Moreover, the elastically and plastically deformed intermediate part radially grips or clamps said member and elastically stresses said part to secure the assembly in a manner that is not destructive for said part.

Moreover, in a preferred manner, the shape of the external wall of the intermediate part substantially matches the aperture of the part, so as to exert a substantially uniform radial stress on the wall of the part surrounding said aperture. Indeed, when research was carried out, it appeared preferable for the intermediate part to uniformly distribute the radial stresses caused by its deformation over the wall of the part surrounding the aperture.

Consequently, if the aperture in the fragile part is circular, it is preferable for the external wall of the intermediate part to be substantially in the shape of a continuous cylinder, i.e. with no radial slot or pierced axial hole apart from the hole for receiving the member, to prevent any localised stresses on a small surface area of the wall of the part surrounding the aperture, which could break the fragile material.

Of course, the shape of the aperture in the fragile part may differ, for example by being asymmetrical, to prevent any relative movements between the elements of the assembly. Thus, according to a first alternative, this asymmetrical aperture may therefore be, for example, substantially elliptical.

Figure 11:
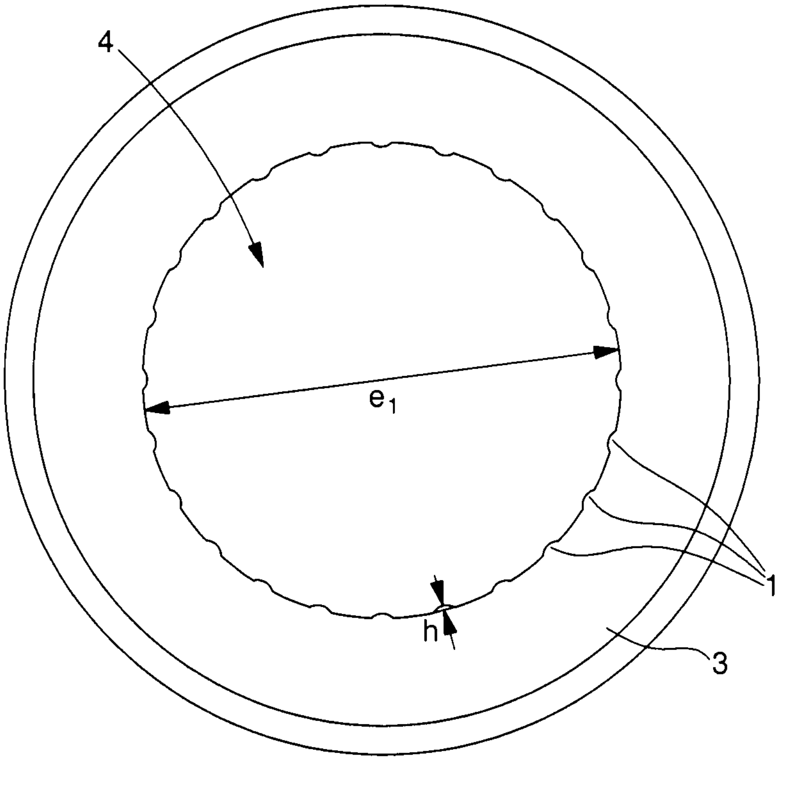
FIG. 11 is a diagram of an alternative aperture for the part made of fragile material.

According to another alternative intended to prevent any relative movements, as seen in FIG. 11, the wall of the part 3 may be provided with flutes 1 projecting into aperture 4. Preferably, flutes 1 run over the entire thickness of part 3 and include a domed external surface of maximum height h. Of course, flutes 1 may or may not be substantially rectilinear.

It is thus clear that these flutes 1 of height h, which are much smaller than the diameter $e_1$ of aperture 4, will form micro-grooves on the external surface of the intermediate part when it is deformed, so as to form mortise and tenon type joints for rotatably securing the wall of aperture 4 and the external surface of the intermediate part.

It is also clear that these flutes could also be present on the external surface of member 5 to obtain the same effect and further improve the rotatable connection of the future assembly.

Consequently, if the section of the aperture is circular, the intermediate part (the shape of which matches the aperture) which has a hole may be interpreted as a full ring with continuous internal and external walls, i.e. without any grooves or more generally any discontinuity of material. Thus, via elastic and plastic deformation, the matching shape of the intermediate part enables a substantially uniform radial stress to be generated over a maximised surface area of the wall of the part around the aperture.

Of course, this matching wall shape also applies to the internal wall of the intermediate part facing the member. It is therefore clear that the shape of the internal wall could match the external shape of the member in order to generate a substantially uniform radial stress of the internal wall of the intermediate part on a maximised surface area of the external wall of the member.

The assembly according to the invention will be better understood with reference to FIGS. 1 to 10 showing example assemblies. FIGS. 1 to 4 show a first embodiment according to the invention. A first step therefore consists in forming part 3 in a material that has no plastic domain and with an aperture 4. As shown in FIG. 1, aperture 4 has a section $e_1$, which is preferably comprised between 0.5 and 2 mm and if appropriate, flutes 1 of FIG. 11 projecting into aperture 4 have a height of between 5 and 25 μm.

This step may be achieved by dry or wet etching, for example DRIE (deep reactive ion etching).

Figure 2:
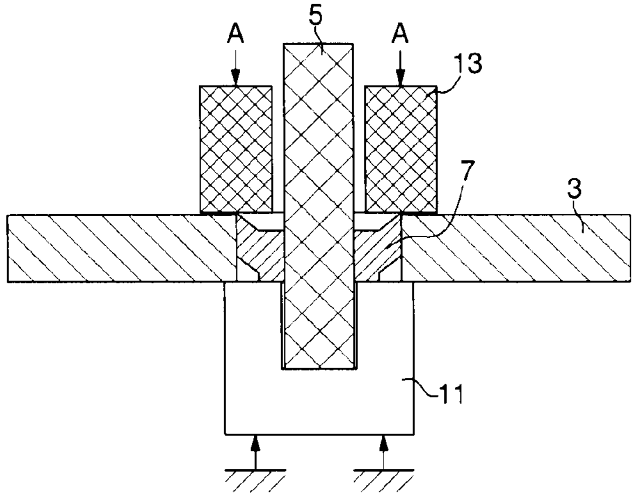

Further, in a second step, the method consists in forming the member, a pivot pin 5 in the example of FIGS. 1 and 2, in a second material with a main section $e_2$. As explained hereinbefore, the second step can be carried out in accordance with usual arbour fabrication processes. Member 5 is preferably metal and may for example be formed of steel.

In a third step, the method consists in forming the intermediate part 7 in a third material, with a hole 8 of internal section $e_4$ and external section $e_3$, the wall of which substantially matches the shape of aperture 4. The third step can thus be achieved by conventional machining and/or an electroforming process. Intermediate part 7 may thus have a thickness of between 100 et 600 μm and a width I, i.e. the external section $e_3$ minus the internal section $e_4$, divided by two ($I=(e_3-e_4)/2$), comprised between 100 et 300 μm.

Preferably, the third material is more ductile than the second material of member 5, so that the latter is less deformed or not deformed at all during the deformation step. Intermediate part 7 is preferably metal and may thus include nickel and/or gold. However, any other ductile material may advantageously be added to the third material or replace the latter.

Of course, the first three steps do not have to observe any particular order and may even be performed at the same time.

In a fourth step, intermediate part 7 is inserted into aperture 4 without any contact. This means, as seen in FIG. 1, that the section $e_1$ of aperture 4 is larger than or equal to the external section $e_3$ of intermediate part 7.

Preferably, the difference between the section $e_1$ of aperture 4, or if appropriate flutes 1, and the external section $e_3$ of intermediate part 7 is approximately 10 μm, i.e. there is a gap of around 5 μm, which separates part 3 relative to intermediate part 7.

Further, preferably, according to the invention, intermediate part 7 is held in aperture 4 using one 11 of tools 11, 13 used for the deformation step. Finally, in a preferred manner, tool 11 includes a recess 12 for receiving member 5.

In a fifth step, member 5 is introduced into hole 8 of intermediate part 7 without any contact. This means, as seen in FIG. 1, that the section $e_4$ of hole 8 is larger than or equal to the external section $e_2$ of member 5.

Preferably, the difference between section $e_4$ of hole 8 and the external section $e_2$ of member 5 is approximately 10 μm, i.e. there is a gap of around 5 μm, which separates member 5 from intermediate part 7.

Further, according to the invention, member 5 is held in hole 8 by using said recess 12 of tool 11 of substantially equivalent section to section $e_2$ of member 5.

Finally, the method includes a sixth step, which consists in elastically and/or plastically deforming intermediate part 7 by moving tools 11, 13 towards each other in axial direction A, so as to exert a radial stress C, B respectively against member 5 and against the wall of the part surrounding aperture 4 by causing the elastic deformation of part 3.

Indeed, unexpectedly, it is not necessary to provide pierced holes through the thickness of part 3 around aperture 4 like those disclosed in EP Patent No 1 445 670, and WO Patent Nos. 2006/122873 and 2007/099068 to prevent breaking the part. Thus, part 3 will be elastically deformed even under high stress, i.e. higher than 450 MPa for silicon, without incipient cracks.

Thus, as seen in FIG. 2, the pressing on the top and bottom parts of intermediate part 7 respectively by tool 13 and 11 in axial direction A, will cause an elastic and plastic deformation of intermediate part 7, which is deformed exclusively radially in directions B and C, i.e. towards part 3 and towards member 5. Once the stress from tools 11, 13 has been released, part 3 exerts an elastic return that will permanently secure the assembly comprising member 5—intermediate part 7—part 3.

Preferably according to the invention, the deformation parameters are set so that the clamping force is greater at the gaps between the non-deformed intermediate part 7 and on the one hand, the wall of aperture 4 and, on the other hand, member 5. Preferably, the clamping force generates a displacement comprised between 16 and 40 μm.

Consequently, the elastic and plastic deformation of intermediate part 7 is required to cause both the elastic deformation of part 3 around aperture 4, and the elastic and/or plastic deformation of member 5, so as to secure member 5, intermediate part 7 and part 3 to each other, as seen in FIG. 2. As illustrated in FIG. 2, it may also happen that the end of intermediate part 7 superficially folds down onto part 3 during deformation, without, however, exerting any axial stress on part 3. Finally, it should be noted that this elastic deformation automatically centres the assembly comprising member 5—intermediate part 7—part 3.

Advantageously according to the invention, no axial force (which, by definition, is liable to be destructive) is applied to part 3 during the process. Only radial elastic deformation, which is controlled according to the programmed stress of tools 11, 13, is applied to part 3. It is also to be noted that the use of intermediate part 7, the external wall of which has substantially the same shape as aperture 4, allows a uniform stress to be exerted on the wall of the part surrounding aperture 4 during the radial deformation B of intermediate part 7, in order to prevent breaking part 3, made of fragile material, and to adapt to any dispersions in fabrication of the various elements, such as for example flutes 1.

Figure 3:
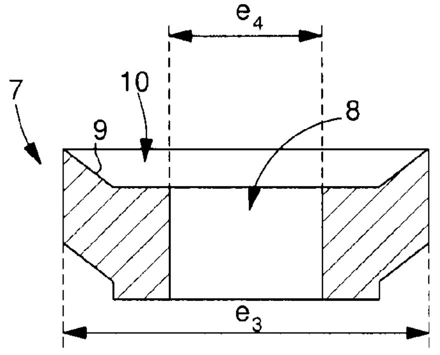
FIGS. 3 and 4 are cross-sectional front or perspective views of the intermediate part according to the invention.
Figure 4:
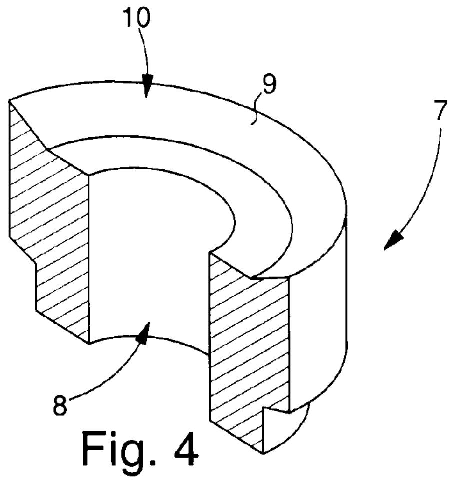

As seen in FIGS. 3 and 4, intermediate part 7 preferably includes a conical recess 10 coaxial to hole 8, in order, in the deformation step, to facilitate the radial orientation B, C of the stress caused by the deformation of intermediate part 7, but also to make said stress gradual. Indeed, the slope 9 forming conical recess 10 results in an initial contact surface against tool 12, which is reduced to a circle, by forcing the external wall of intermediate part 7 to deform radially with a gradual clamping force against the wall of the part surrounding aperture 4 and against member 5.

In the example illustrated in FIGS. 3 and 4, it is seen that the conical recess 10 communicates with hole 8 forming a flat portion between the slope 9 and the edge of the hole 8. This feature, i.e. the communication between conical recess 10 and hole 8, as shown below, is not however essential and recess 10 and slope 9 thereof may be of different shapes and dimensions.

Of course, this invention is not limited to the illustrated example but is capable of various variants and alterations that will appear to those skilled in the art. In particular, part 3 may also be axially locked in an alternative of the first embodiment.

Figure 5:
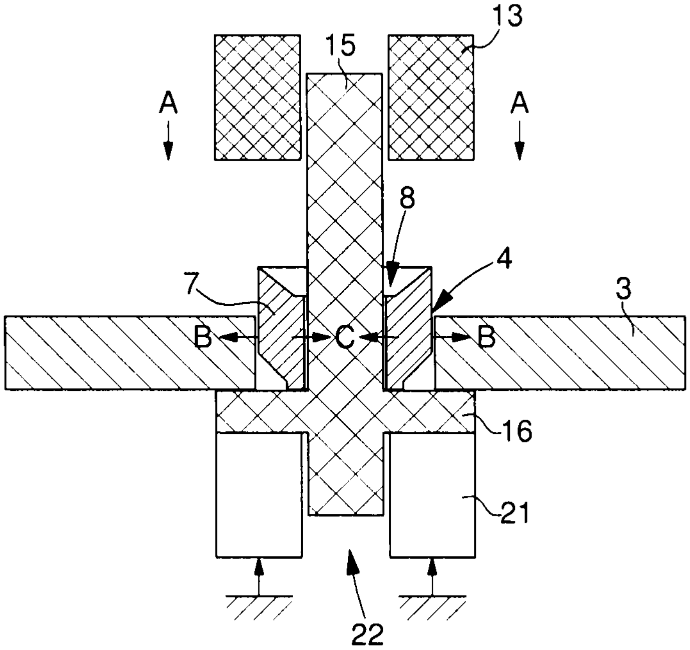
FIGS. 5 and 6 are diagrams of alternative steps of the assembly method according to the invention.
Figure 6:
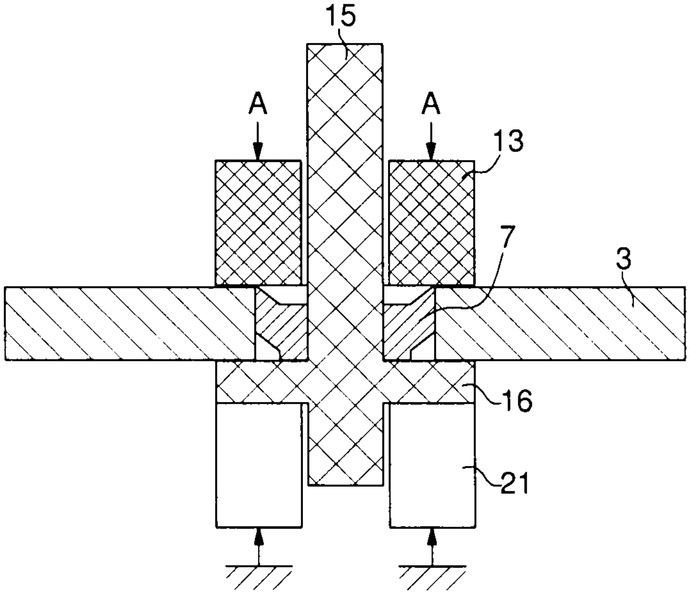

By way of example, FIGS. 5 and 6 illustrate a second embodiment of the method. Thus, FIGS. 5 and 6 show an alternative in which member 15 is substantially different from member 5 in that it has a collar 16. Therefore, the bottom portion of tool 21 no longer needs to have a recess 12 for receiving member 15, but simply has a through hole 22, the section of which is at least equal to or greater than that of member 15.

It is thus clear that the intermediate part 7 and if appropriate part 3, could then be carried by collar 16. Further, the deformation of intermediate part 7 on the bottom portion thereof is no longer achieved directly by tool 21, but via collar 16, with no loss of advantage to the method. Thus, part 3 is under elastic stress at intermediate part 7 and is locked against collar 16 of member 15.

By way of example, FIGS. 7 to 10 show a third embodiment of the method. Thus, FIGS. 7 to 10 show an alternative wherein the intermediate part 27, 27', 27", 27'" is substantially different from the intermediate part 7 of the first embodiment, in that it has a collar 26, 26', 26", 26'". Consequently, the third embodiment uses the same tools 11, 13 as the first embodiment. Thus, part 3 is under elastic stress at intermediate part 27, 27', 27", 27'" and is locked against the collar 26, 26', 26", 26'".

Figure 7:
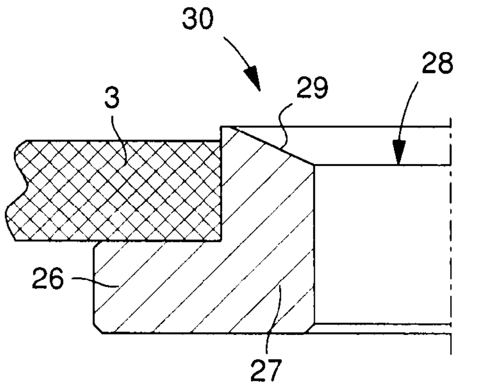
FIGS. 7 to 10 are diagrams of variants of the intermediate part according to the invention.
Figure 8:
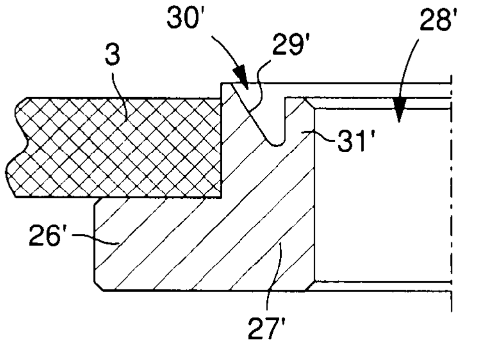
Figure 9:
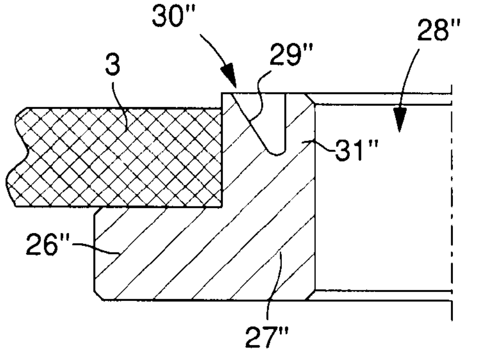
Figure 10:
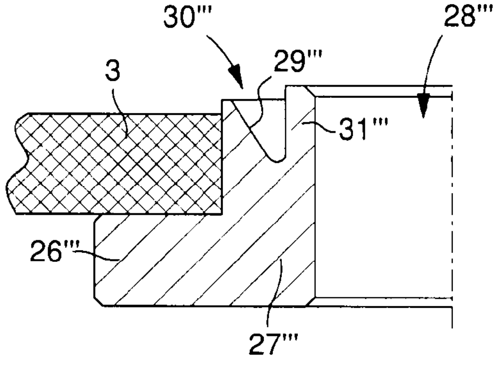

In a first variant illustrated in FIG. 7, the intermediate part 27 includes a conical recess 30, whose slope 29 communicates directly with hole 28, i.e. with no flat portion.

It is also possible, in a second variant, for the intermediate part 27', 27", 27'" to include a conical recess 30', 30", 30'", whose slope 29', 29", 29'" does not communicate with the hole 28', 28", 28'", but is separated therefrom by a ring 31', 31", 31'". The height of the ring may thus be less 31' than that of the end of the slope 29', equal 31" to that of the end of the slope 29" or greater 31'" to that of the end of the slope 29'". Of course, for this second variant, in the deformation step, tool 13 is opposite the slope 29', 29", 29'" without entering into contact with the ring 31', 31", 31'".

The embodiments presented above may be combined with each other depending upon the intended application. Moreover, the assemblies may be applied, by way of non-limiting example, to an element of a timepiece, such as pallets, an escape wheel, a balance spring, a balance, a bridge or more generally a wheel set.

It is also possible to use the assembly disclosed hereinbefore in place of the elastic means 48 or the cylinders 63, 66 of WO Patent No. 2009/115463 (which is incorporated herein by reference) so as to fix a single-piece sprung balance resonator to a pivot pin.

Of course, two members like those described hereinbefore may also be secured to the same arbour using two distinct assemblies, so as to unite their respective movement.

Finally, assemblies according to the invention can also join any type of timepiece or other member, whose body is formed of a material having no plastic domain (silicon, quartz, etc.) to an arbour, such as, for example, a tuning fork resonator or more generally a MEMS (Microelectromechanical system).

What is claimed is:

1. A method of assembling a member made of a first material in a part made of a second material having no plastic domain, including the following steps:

a) forming the part with an aperture;

b) inserting an intermediate part, which is made of a third material and includes a hole into the aperture without any stress;

c) introducing the member into the hole without any stress;

d) elastically and plastically deforming the intermediate part by moving two tools towards each other axially, respectively on the top and bottom parts of said intermediate part, so as to exert a radial stress against the member and against the wall of the part surrounding the aperture by causing the elastic deformation of the part, in order to secure the assembly in a manner that is not destructive for said part.

2. The method according to claim 1, wherein the shape of the external wall of the intermediate part substantially matches the aperture of the part, so as to exert a substantially uniform radial stress on the wall of the part surrounding the aperture.

3. The method according to claim 1, wherein the aperture of the part is circular.

4. The method according to claim 1, wherein the wall of the part surrounding the aperture includes flutes which, in step d), will form micro-grooves on the external surface of the intermediate part to prevent any relative movements between the elements of said assembly.

5. The method according to claim 1, wherein the external surface of the member includes flutes which, in step d), will form micro-grooves on the internal surface of the intermediate part to prevent any relative movements between the elements of said assembly.

6. The method according to claim 1, wherein the aperture of the part is asymmetrical to prevent any relative movements between the elements of said assembly.

7. The assembly method according to claim 1, wherein, in step b), the difference between the section of the aperture and the external section of the intermediate part is approximately 10 μm.

8. The assembly method according to claim 1, wherein, in step c), the difference between the section of the member and the internal section of the intermediate part is approximately 10 μm.

9. The assembly method according to claim 1, wherein, in step d), the deformation exerts a clamping force generating a displacement comprised between 16 et 40 μm.

10. The assembly method according to claim 1, wherein, in step b), the intermediate part includes a conical recess coaxial to the hole in order, in step d), to facilitate the radial orientation of the stress caused by the deformation of the intermediate part.

11. The assembly method according to claim 1, wherein the second material is formed from a single crystal silicon base.

12. The assembly method according to claim 1, wherein the third material is formed from a metal or metal alloy base.

13. The assembly method according to claim 1, wherein the part is a timepiece wheel set.

14. The assembly method according to claim 1, wherein the part is timepiece pallets.

15. The assembly method according to claim 1, wherein the part is a timepiece balance spring.

16. The assembly method according to claim 1, wherein the part is a resonator.

17. The assembly method according to claim 1, wherein the part is a MEMS.

* * * * *